(12) United States Patent
Kim et al.

(10) Patent No.: US 10,096,810 B2
(45) Date of Patent: Oct. 9, 2018

(54) SEPARATOR AND METHOD OF MANUFACTURING THE SAME AND RECHARGEABLE LITHIUM BATTERY INCLUDING THE SAME

(71) Applicant: SAMSUNG SDI CO., LTD., Yongin-si, Gyeonggi-do (KR)

(72) Inventors: Ihn Kim, Yongin-si (KR); Sam-Jin Park, Yongin-si (KR); Jung-Ock Yeou, Yongin-si (KR); Kwi-Seok Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 635 days.

(21) Appl. No.: 13/683,529

(22) Filed: Nov. 21, 2012

(65) Prior Publication Data
US 2013/0302661 A1    Nov. 14, 2013

Related U.S. Application Data

(60) Provisional application No. 61/645,455, filed on May 10, 2012.

(51) Int. Cl.
*H01M 2/16* (2006.01)
*H01M 2/14* (2006.01)
*H01M 10/052* (2010.01)

(52) U.S. Cl.
CPC ......... *H01M 2/1633* (2013.01); *H01M 2/145* (2013.01); *H01M 2/166* (2013.01);
(Continued)

(58) Field of Classification Search
CPC .... H01M 2/166; H01M 2/1673; H01M 2/168; H01M 2/1686
(Continued)

(56) References Cited

U.S. PATENT DOCUMENTS

| 6,890,684 B2 | 5/2005 | Ohsaki et al. |
| 2004/0009397 A1* | 1/2004 | Kim ........................ C08F 14/18 429/217 |

(Continued)

FOREIGN PATENT DOCUMENTS

| CN | 1467258 A | 1/2004 |
| CN | 101048892 A | 10/2007 |

(Continued)

OTHER PUBLICATIONS

EPO Search Report dated Jul. 19, 2013, for corresponding European Patent application 13166546.5, (6 pages).
(Continued)

*Primary Examiner* — Jonathan G Leong
(74) *Attorney, Agent, or Firm* — Lewis Roca Rothgerber Christie LLP

(57) ABSTRACT

A separator for a lithium battery includes a porous substrate and a coating layer on at least one side of the porous substrate, the coating layer having a first side adjacent to the porous substrate, and a second side opposite the first side. The coating layer may include an inorganic compound and a polymer binder, and an amount of the polymer binder at the second side is greater than an amount of the polymer binder at the first side. A rechargeable lithium battery includes the separator.

10 Claims, 5 Drawing Sheets

(52) U.S. Cl.
CPC ......... *H01M 2/168* (2013.01); *H01M 2/1673* (2013.01); *H01M 2/1686* (2013.01); *H01M 10/052* (2013.01); *H01M 2/1646* (2013.01); H01M 2/1653 (2013.01)

(58) Field of Classification Search
USPC ............................... 429/247, 249, 251, 252
See application file for complete search history.

(56) References Cited

U.S. PATENT DOCUMENTS

| | | | |
|---|---|---|---|
| 2006/0194116 A1 | 8/2006 | Suzuki et al. | |
| 2006/0257739 A1* | 11/2006 | Ryu ..................... | H01M 4/13 429/217 |
| 2007/0054183 A1 | 3/2007 | Kim et al. | |
| 2007/0264577 A1* | 11/2007 | Katayama .............. | H01M 2/162 429/246 |
| 2008/0292968 A1* | 11/2008 | Lee ....................... | H01M 2/14 429/247 |
| 2009/0067119 A1 | 3/2009 | Katayama et al. | |
| 2009/0305141 A1 | 12/2009 | Lee et al. | |
| 2010/0316903 A1 | 12/2010 | Kim et al. | |
| 2011/0003209 A1* | 1/2011 | Katayama ........... | H01M 2/1606 429/246 |
| 2011/0091775 A1* | 4/2011 | Lee ....................... | H01M 4/13 429/331 |
| 2012/0090758 A1 | 4/2012 | Lee et al. | |
| 2012/0115036 A1 | 5/2012 | Lee et al. | |

FOREIGN PATENT DOCUMENTS

| | | |
|---|---|---|
| CN | 101326658 A | 12/2008 |
| JP | 2004-095538 | 3/2004 |
| JP | 2009-518809 A | 5/2009 |
| JP | 2009-529762 A | 8/2009 |
| JP | 2010-146839 A | 7/2010 |
| JP | 4602254 B2 | 10/2010 |
| JP | 2011-505663 A | 2/2011 |
| JP | 2015-115168 A | 6/2015 |
| KR | 10-2004-0103425 | 12/2004 |
| KR | 10-0727247 B1 | 6/2007 |
| KR | 10-0767966 | 10/2007 |
| KR | 10-0935003 B1 | 12/2009 |
| KR | 10-2011-0097715 | 8/2011 |
| KR | 10-2011-0129203 A | 12/2011 |
| WO | WO 2007/105869 A1 | 9/2007 |
| WO | WO 2008/029922 A1 | 3/2008 |
| WO | WO 2011/105865 A2 | 9/2011 |
| WO | WO 2011/105866 A2 | 9/2011 |

OTHER PUBLICATIONS

European Patent Office action dated Oct. 15, 2015 in application No. EP 13166546.5, 7 pages.
Kevin, "Compatibility of JSR Binder in Negative Electrode", JSR Corporation, Mar. 2011, 10 pages.
SIPO Office action dated May 5, 2016, issued in CN Application No. 201310170793.7, 8 pages.
JPO Office Action dated Mar. 27, 2017, for corresponding Japanese Patent Application No. 2013-063567 (4 pages).
SIPO Office Action dated Jan. 22, 2017, for corresponding Chinese Patent Application No. 201310170793.7 (14 pages).
EPO Office Action dated Feb. 27, 2017, for corresponding European Patent Application No. 13166546.5 (8 pages).
JPO Notice of Allowance dated Dec. 25, 2017, for corresponding Japanese Patent Application No. 2013-063567 (3 pages).
KIPO Office Action dated Nov. 1, 2017, for corresponding Korean Patent Application No. 10-2012-0133994 (6 pages).

\* cited by examiner

SEPARATOR AND METHOD OF MANUFACTURING THE SAME AND RECHARGEABLE LITHIUM BATTERY INCLUDING THE SAME

CROSS-REFERENCE TO RELATED APPLICATION

This application claims priority to and the benefit of U.S. Provisional Application No. 61/645,455, filed in the U.S. Patent and Trademark Office on May 10, 2012, the entire contents of which are incorporated herein by reference.

BACKGROUND (a) Field

This disclosure relates to a separator, a method of manufacturing the same, and a rechargeable lithium battery including the same.

(b) Description of the Related Art

A non-aqueous rechargeable lithium battery includes a separator made of a porous insulating film that is positioned between positive and negative electrodes. Pores of the film are impregnated by an electrolyte including a lithium salt dissolved therein. Generally, non-aqueous rechargeable lithium batteries have high capacity and high energy density.

However, when the positive and negative electrodes of a rechargeable lithium battery are repetitively contracted and expanded during the charge and discharge cycles, or when exothermic heat due to abnormal operation of the battery becomes high, the battery temperature may abruptly increase. In this case, the separator may be abruptly contracted or destroyed, and short-circuit of the electrodes may occur.

Accordingly, coating heat resistant inorganic particles along with a binder on at least one side of the separator in order to improve battery stability has been suggested. However, when the amount of heat resistant inorganic particles becomes large, less binder is included, thereby deteriorating the adhesion of the separator to the electrode.

SUMMARY

Embodiments of the present invention are directed to a separator having improved adhesion to an electrode, thereby improving the stability of a battery.

In some embodiments, a separator for a lithium battery includes a porous substrate and a coating layer on at least one side of the porous substrate, the coating layer having a first side adjacent to the porous substrate, and a second side opposite the first side. The coating layer may include an inorganic compound and a polymer binder, and an amount of the polymer binder at the second side may be greater than an amount of the polymer binder at the first side.

In some embodiments, the polymer binder may include a first polymer binder and a second polymer binder, and the first polymer binder may have a different average particle diameter than the second polymer binder. The first polymer binder may have a first average particle diameter and the second polymer binder may have a second average particle diameter, and the second average particle diameter may be less than or equal to 80% of the first average particle diameter. The first average particle diameter may be about 50 nm to about 500 nm, and the second average particle diameter may be about 20 nm to about 400 nm.

The polymer binder may include a greater amount of the first polymer binder than the second polymer binder. The first polymer binder may be present in the polymer binder in an amount of about 70 to 99 parts by weight based on the total weight of the polymer binder, and the second polymer binder may be present in the polymer binder in an amount of about 1 to 30 parts by weight based on the total weight of the polymer binder.

The first and second polymer binders may be emulsion polymer binders. The first and second polymer binders may be independently selected from diene-based polymers, acrylate-based polymers, styrene-based polymers, urethane-based polymers, polyolefin-based polymers, or combinations thereof.

The emulsion type polymer binder may be a styrene-butadiene rubber, an acrylated styrene-butadiene rubber, an acrylonitrile-butadiene rubber, an acrylonitrile-butadiene-styrene rubber, an acrylic rubber, a butyl rubber, a fluorine rubber, polytetrafluoroethylene, polyethylene, polypropylene, ethylene propylene copolymer, polyethyleneoxide, polyvinylpyrrolidone, polyepichlorohydrine, polyphosphazene, polyacrylate, polyacrylonitrile, polystyrene, ethylene propylene diene copolymer, polyvinylpyridine, chlorosulfonated polyethylene, latex, a polyester resin, an acrylic resin, a phenolic resin, an epoxy resin, polyvinylalcohol, carboxylmethylcellulose, hydroxypropylmethylcellulose, hydroxypropylcellulose, diacetylcellulose, or a combination thereof.

In some embodiments, the polymer binder includes a solvent-soluble polymer binder and an emulsion polymer binder. The solvent-soluble polymer binder may be selected from polyvinylidene fluoride (PVdF), polyvinylidene fluoride-hexafluoropropylene (PVdF-co-HFP), polyvinylidene fluoride-trichloroethylene, polyvinylpyrrolidone, polyethyleneoxide (PEO), polyacrylonitrile (PAN), polyimide (PI), polyamic acid (PAA), polyamideimide (PAI), aramids, polyvinylacetate (PVA), ethylenevinylacetate copolymers, ethyleneethylacrylate copolymers, polymethylmethacrylate (PMMA), polyvinylether (PVE), carboxymethylcellulose, polyacrylic acid, polyvinyl alcohol, or combinations thereof. The emulsion polymer may be selected from diene-based polymers, acrylate-based polymers, styrene-based polymers, urethane-based polymers, polyolefin-based polymers, or combinations thereof. The emulsion-type polymer binder may be, for example, a diene-based polymer, an acrylate-based polymer, a styrene-based polymer, a urethane-based polymer, a polyolefin-based polymer, or a combination thereof. For example, the emulsion type polymer binder may be a styrene-butadiene rubber, an acrylated styrene-butadiene rubber, an acrylonitrile-butadiene rubber, an acrylonitrile-butadiene-styrene rubber, an acrylic rubber, a butyl rubber, a fluorine rubber, polytetrafluoroethylene, polyethylene, polypropylene, ethylene propylene copolymer, polyethyleneoxide, polyvinylpyrrolidone, polyepichlorohydrin, polyphosphazene, polyacrylate, polyacrylonitrile, polystyrene, ethylene propylene diene copolymer, polyvinylpyridine, chlorosulfonated polyethylene, latex, a polyester resin, an acrylic resin, a phenolic resin, an epoxy resin, polyvinylalcohol, carboxymethylcellulose, hydroxypropylmethylcellulose, hydroxypropylcellulose, diacetylcellulose, or a combination thereof.

The polymer binder may include a greater amount of the solvent-soluble polymer binder than the emulsion polymer binder. The solvent-soluble polymer binder may be present in the polymer binder in an amount of about 70 to 99 parts by weight based on the total weight of the polymer binder, and the emulsion polymer binder may be present in the polymer binder in an amount of about 1 to 30 parts by weight based on the total weight of the polymer binder.

The polymer binder may be present in the coating layer in an amount of about 1 to 30 parts by weight based on 100 parts by weight of the inorganic compound. The inorganic compound may include a material selected from metal oxides, semi-metal oxides, metal fluorides, metal hydroxides, or combinations thereof. The inorganic compound may be selected from $Al_2O_3$, $SiO_2$, $TiO_2$, $SnO_2$, $CeO_2$, MgO, NiO, CaO, ZnO, $ZrO_2$, $Y_2O_3$, $SrTiO_3$, $BaTiO_3$, $Mg(OH)_2$, MgF, or combinations thereof. The inorganic compound may have a particle diameter of about 1 nm to 800 nm.

The porous substrate may include a glass fiber, polyester, TEFLON (tetrafluoroethylene), pololefin, polytetrafluoroethylene (PTFE), or a combination thereof.

In some embodiments, a rechargeable lithium battery includes a positive electrode including a positive active material, a negative electrode including a negative active material, and one of the above described separators between the positive electrode and the negative electrode. The first side of the coating layer of the separator is in contact with either one of the positive or negative electrodes, and the second side of the coating layer is in contact with the porous substrate.

In some embodiments, a method of forming a lithium battery includes mixing an inorganic compound and a polymer binder to form a slurry, applying the slurry to at least one side of a porous substrate, and drying the slurry at a rate of about 30 to 70%/min to form a coating layer. The coating layer may have a first side adjacent to the porous substrate and a second side opposite the first side. An amount of the polymer binder at the second side may be greater than an amount of the polymer binder at the first side. The drying the slurry may include drying the slurry at a rate of about 40 to 60%/min.

Embodiments of the present invention provide a separator having better adhesion to the electrodes, thereby improving the characteristics and stability of the resulting battery.

DETAILED DESCRIPTION

The present invention will be described more fully hereinafter, in which exemplary embodiments of the invention are shown and described. As those skilled in the art would realize, the described embodiments may be modified in various different ways, all without departing from the spirit or scope of the present invention.

Figure 1:
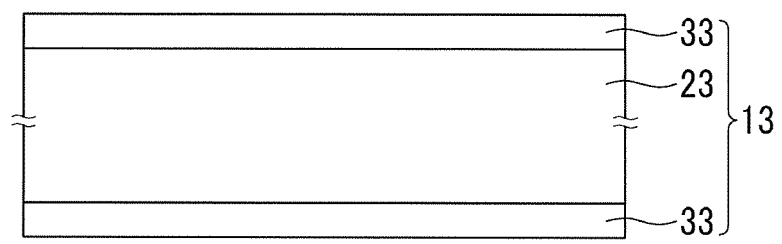
FIG. 1 is a schematic cross-sectional view of a separator for a rechargeable lithium battery according to one embodiment.

Hereinafter, referring to the drawings, a separator for a rechargeable lithium battery according to one embodiment is described. FIG. 1 is a cross-sectional view of a separator for a rechargeable lithium battery according to one embodiment.

The separator 13 includes a porous substrate 23 and a coating layer 33 disposed on one side or both sides of the porous substrate 23.

The porous substrate 23 may include, for example, a glass fiber, a polyester, TEFLON (tetrafluoroethylene), a polyolefin, polytetrafluoroethylene (PTFE), or a combination thereof. The polyolefin may be, for example, polyethylene, polypropylene, or the like.

The porous substrate 23 may be a single layer or a multilayer, such as a mixed multilayer. For example, a mixed multilayer porous substrate may be a polyethylene/polypropylene double separator, a polyethylene/polypropylene/polyethylene triple separator, a polypropylene/polyethylene/polypropylene triple separator, or the like.

The coating layer 33 includes an inorganic compound and a polymer binder.

The inorganic compound is a ceramic material capable of improving heat resistance, and may include, for example, a metal oxide, a semi-metal oxide, a metal fluoride, a metal hydroxide, or a combination thereof. Exemplary inorganic compounds include $Al_2O_3$, $SiO_2$, $TiO_2$, $SnO_2$, $CeO_2$, MgO, NiO, CaO, ZnO, $ZrO_2$, $Y_2O_3$, $SrTiO_3$, $BaTiO_3$, $Mg(OH)_2$, and combinations thereof.

The inorganic compound may improve the heat resistance of the coating layer and thus may prevent abrupt contraction or transformation of the separator as a result of temperature increase.

The inorganic compound may be a particle and, for example, may have a particle diameter of about 1 nm to about 800 nm. In some embodiments, the particle diameter may be about 100 nm to about 600 nm. An inorganic compound having a particle diameter within the above range may impart appropriate strength to the coating layer 33.

The polymer binder adheres the inorganic compound to the porous substrate 23 and may simultaneously, adhere the porous substrate 23 at one side of the coating layer 33 to the electrode (not shown) at the other side of the coating layer.

The amount of the polymer binder may be greater at the surface of the coating layer 33 than the amount of the polymer binder at the interior of the coating layer 33 adjacent to the porous substrate 23. The "surface of the coating layer" 33 may be a portion contacting the electrode.

Figure 2:
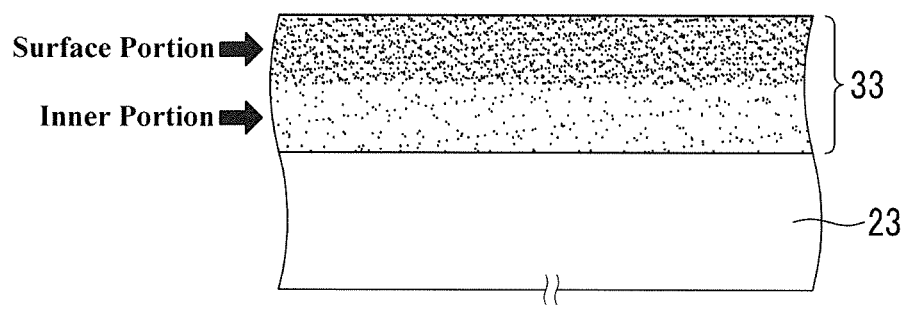
FIG. 2 is a close-up view of the coating layer of the separator of FIG. 1.

FIG. 2 is an enlarged view of the coating layer of the separator of FIG. 1.

In FIG. 2, for better comprehension and ease of description, the region where more of the polymer binder is included in the coating layer 33 is shaded darker, while the region where less of the polymer binder is included in the coating layer 33 is shaded lighter.

Referring to FIG. 2, more of the polymer binder is included at the surface of the coating layer 33 than at the inside of the coating layer 33. When more of the polymer binder is included at the surface of the coating layer 33 than at the inside of the coating layer 33, the separator may be better adhered to the electrode.

Accordingly, since the coating layer 33 includes the polymer binder at the surface without decreasing the total amount of the inorganic compound in the coating layer, the separator having the coating layer 33 may be well adhered to an electrode. Accordingly, the coating layer 33 may improve both heat resistance and adhesion.

Figure 3:
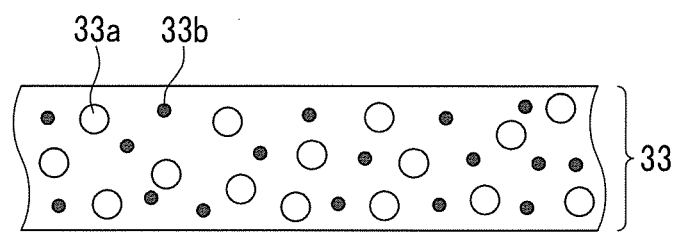
FIG. 3 is a schematic view of a coating layer made by a method according to an embodiment of the invention.
Figure 4:
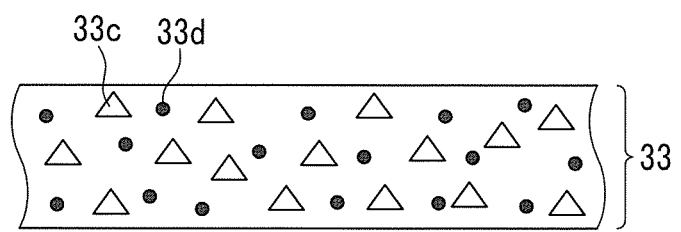
FIG. 4 is a schematic view of a coating layer made by a method according to an embodiment of the invention.

Hereinafter, a method of forming the coating layer 33 is described with reference to the drawings. FIGS. 3 and 4 are views of coating layers made by methods according to embodiments of the invention.

According to an embodiment of a method of forming a coating layer, and referring to FIG. 3 (along with FIG. 1), a slurry includes an inorganic compound (not shown), a first polymer binder 33a having a first average particle diameter, and a second polymer binder 33b having a second average particle diameter of less than or equal to about 80% of the first average particle diameter. The slurry may then be coated on one side of a porous substrate 23. In some embodiments, the second polymer binder 33b may have a second average particle diameter of less than or equal to about 50%.

Herein, the first average particle diameter may be about 50 nm to about 500 nm and the second average particle diameter may be about 20 nm to about 400 nm. When the first and second polymer binders have average particle diameters within the above described ranges, a polymer emulsion (e.g., the above described coating layer slurry) may have appropriate viscosity and sufficient adhesive properties.

The first polymer binder 33a is a main polymer binder that fixes the inorganic compound on the porous substrate 23, and the second polymer binder 33b is an auxiliary polymer binder that increases the adhesive properties of the coating layer. The first and second polymer binders 33a and 33b may be respectively included in an amount of about 70 to 99 parts by weight and about 1 to 30 parts by weight based on the total weight of the polymer binder. When the first and second polymer binders 33a and 33b are included within the above described ranges, the coating layer may be sufficiently adhered to the porous substrate. Furthermore, when the first and second polymer binders 33a and 33b are included within the above described ranges, the coating layer does not have excessive adhesive qualities, thereby preventing the separators from sticking together due to excessive stickiness at the surface of the coating layer.

As the slurry is dried, the polymer binder and the inorganic compound in the coating layer may move toward the surface of the coating layer due to thermal convection, since the surface of the coating layer may be dried earlier than the inside. Herein, the second polymer binder 33b having a smaller average particle diameter may more easily move toward the surface of the coating layer. Accordingly, more of the polymer binder (e.g., the second polymer binder) is included at the surface and may increase the surface adhesion of the coating layer 33.

Herein, the first polymer binder 33a and the second polymer binder 33b may be emulsion-type polymer binders and the first and second polymer binder may be the same or different. The emulsion-type polymer binder may be, for example, a diene-based polymer, an acrylate-based polymer, a styrene-based polymer, a urethane-based polymer, a polyolefin-based polymer, or a combination thereof. For example, the emulsion type polymer binder may be a styrene-butadiene rubber, an acrylated styrene-butadiene rubber, an acrylonitrile-butadiene rubber, an acrylonitrile-butadiene-styrene rubber, an acrylic rubber, a butyl rubber, a fluorine rubber, polytetrafluoroethylene, polyethylene, polypropylene, ethylene propylene copolymer, polyethyleneoxide, polyvinylpyrrolidone, polyepichlorohydrin, polyphosphazene, polyacrylate, polyacrylonitrile, polystyrene, ethylene propylene diene copolymer, polyvinylpyridine, chlorosulfonated polyethylene, latex, a polyester resin, an acrylic resin, a phenolic resin, an epoxy resin, polyvinylalcohol, carboxymethylcellulose, hydroxypropylmethylcellulose, hydroxypropylcellulose, diacetylcellulose, or a combination thereof.

The emulsion-type polymer binder may be prepared by emulsion polymerization or a phase inversion method using a polymerizable monomer. The emulsion polymerization method and phase inversion method are not particularly limited, and any suitable method may be used.

The polymerizable monomer may be, for example, an ethylenically unsaturated carbonic acid alkyl ester such as methyl (meth)acrylate, butyl (meth)acrylate, ethyl (meth)acrylate, hexyl(meth)acrylic acid-2-ethyl, or the like; an ethylenically unsaturated monomer having a cyano group such as acrylonitrile, methacrylonitrile, fumaronitrile, α-chloro acrylonitrile, α-cyanoethylacrylonitrile, or the like; a conjugated diene monomer such as 1,3-butadiene, isoprene, 2,3-dimethyl-1,3-butadiene, 2-ethyl-1,3-butadiene, 1,3-pentadiene, chloroprene, or the like; an ethylenically unsaturated carboxylic acid or a salt thereof, such as acrylic acid, methacrylic acid, maleic acid, fumaric acid, citraconic acid, or the like; an aromatic vinyl monomer such as styrene, alkyl styrene, vinyl naphthalene, or the like; a fluorine alkyl vinyl ether such as fluorine ethyl vinyl ether or the like; a non-conjugated diene monomer such as vinyl pyridine or the like; a α-olefin such as ethylene, propylene, or the like; an ethylenically unsaturated amide monomer such as (meth)acryl amide or the like; a sulfonic acid-based unsaturated monomer such as acryl amide methyl propane sulfonic acid, styrene sulfonic acid, or the like; or the like.

In addition, the polymerizable monomer may be a polymerizable monomer having a cross-linking functional group. The cross-linking functional group is a functional group that works as a cross-linking point when the polymer binder is cross-linked. The cross-linking functional group may be, for example, a hydroxyl group, a glycidyl group, an amino group, an N-methanol group, a vinyl group, or the like. The polymerizable monomer including the cross-linking functional group may be, for example, a hydroxy ester of an ethylenically unsaturated carboxylic acid such as (meth)acrylic acid hydroxy propyl, (meth)acrylic acid hydroxy ethyl, or the like; a glycidyl ester of an ethylenically unsaturated carboxylic acid such as glycidyl(meth)acrylate or the like; an amino ester of an ethylenically unsaturated carboxylic acid such as dimethyl amino ethyl(meth)acrylate or the like; a methylol group-containing ethylenically unsaturated amide such as N-methylol(meth)acryl amide, N,N-dimethylol(meth)acryl amide, or the like; a monomer including at least two vinyl groups such as ethylene di(meth)acrylate, divinyl benzene, or the like.

The polymerizable monomer including the cross-linking functional group may be included at less than or equal to about 5 wt % based on the total weight of the polymerizable monomer. In some embodiments, the cross-linking functional group may be included at less than or equal to about 2 wt % based on the total weight of the polymerizable monomer.

According to another embodiment of a method of forming a coating layer, and referring to FIG. 4 (along with FIG. 1), a slurry includes an inorganic compound (not shown), a solvent-soluble polymer binder as a third polymer binder 33c, an emulsion polymer binder as a fourth polymer binder 33d, and a solvent. The slurry may be coated on one side of the porous substrate 23.

The third polymer binder 33c is a solvent-soluble polymer binder and a main polymer binder. The solvent-soluble polymer binder is a polymer binder soluble in a solvent, and may be, for example, polyvinylidene fluoride (PVdF), polyvinylidene fluoride-hexafluoropropylene (PVdF-co-HFP), polyvinylidene fluoride-trichloroethylene, polyvinylpyrrolidone, polyethyleneoxide (PEO), polyacrylonitrile (PAN), polyimide (PI), polyamic acid (PAA), polyamideimide (PAI), an aramid, polyvinylacetate (PVA), an ethylenevinylacetate copolymer, an ethyleneethylacrylate copolymer, polymethylmethacrylate (PMMA), polyvinylether (PVE), carboxylmethylcellulose, polyacrylic acid, polyvinyl alcohol, or a combination thereof.

The fourth polymer binder 33d is an emulsion polymer binder, which exists as a particulate in a solvent. The fourth polymer binder 33d (i.e., the emulsion polymer binder) is an auxiliary polymer binder. The emulsion polymer binder may be, for example, a diene-based polymer, an acrylate-based polymer, a styrene-based polymer, an urethane-based polymer, a polyolefin-based polymer, or a combination thereof. For example, the emulsion polymer binder may be a styrene-butadiene rubber, an acrylated styrene-butadiene rubber, an acrylonitrile-butadiene rubber, an acrylonitrile-butadiene-styrene rubber, an acrylic rubber, a butyl rubber, a fluorine rubber, polytetrafluoroethylene, polyethylene, polypropylene, ethylene propylene copolymer, polyethyleneoxide, polyvinylpyrrolidone, polyepichlorohydrine, polyphosphazene, polyacrylate, polyacrylonitrile, polystyrene, ethylene propylene diene copolymer, polyvinylpyridine, chlorosulfonated polyethylene, latex, a polyester resin, an acrylic resin, a phenolic resin, an epoxy resin, polyvinylalcohol, carboxymethylcellulose, hydroxypropylmethylcellulose, hydroxypropylcellulose, diacetylcellulose, or a combination thereof.

The third polymer binder 33c and the fourth polymer binder 33d may be respectively included in an amount of about 70 to 99 parts by weight and about 1 to 30 parts by weight based on the total weight of the polymer binder. When the third polymer binder 33c and the fourth polymer binder 33d are included within the above described range, the coating layer does not have excessive adhesive qualities, thereby preventing the separators from sticking together due to excessive stickiness at the surface of the coating layer.

As the slurry is dried, the solvent may move toward the surface of the coating layer due to thermal convection, because the surface of the coating layer may be dried earlier than the inside of the coating layer. Herein, the polymer binder may move toward the surface of the coating layer, along with the solvent. The emulsion polymer binder existing as particulate in the solvent may more easily move to the surface along with the solvent. Accordingly, more of the polymer binder may exist at the surface than at the inside, thereby increasing the adhesive properties of the coating layer 33 at the surface.

Furthermore, when the solvent-soluble polymer binder (such as polyvinylidene fluoride (PVdF)) and the emulsion polymer binder (such as a styrene-butadiene rubber) exist at the surface of the coating layer 33, the adhesive properties of the coating layer to a negative active material layer or to a positive active material layer may be improved. Accordingly, the separator having the coating layer 33 may have good adhesion with both the positive and negative electrodes.

The polymer binder may be included in an amount of about 1 to 30 parts by weight based on 100 parts by weight of the inorganic compound. In some embodiments, the polymer binder may be included in an amount of about 10 to 20 parts by weight based on 100 parts by weight of the inorganic compound. When the binder is included within the above described ranges, the coating layer may more strongly adhere to the porous substrate and may more strongly adhere the porous substrate to the electrode, without closing the pores in the porous substrate, thus maintaining ion conductivity.

Any suitable solvent may be used. For example, the solvent may be dimethyl formamide, dimethyl acetamide, tetramethyl urea, triethyl phosphate, N-methyl-2-pyrrolidone, dimethyl sulfoxide, acetone, methyl ethyl ketone, methyl isobutyl ketone, cyclohexanone, or combinations thereof.

Hereinafter, a method of fabricating the separator is illustrated.

According to one embodiment, the method of manufacturing a separator may include applying a slurry that includes an inorganic compound and a polymer binder on at least one side of a porous substrate and drying the slurry to form a coating layer.

As described above, the polymer binder may be a mixture of the polymer binders having a different particle size or a mixture of a solvent-soluble polymer binder and an emulsion polymer binder.

The slurry may be dried by using, for example, hot air drying, infrared drying, or the like at a drying rate of about 30 to 70%/min.

Herein, the drying rate refers to a speed of drying about 30 to 70% of the solvent in the slurry per minute. The drying rate may depend on a variety of factors including the drying temperature, the amount of provided air, the amount of discharged air, the wind speed, the heating method, and the like. When the drying rate is within the above described range, the polymer binder sufficiently moves toward the surface of the coating layer as described above, and the surface of the coating layer may be prevented from cracking or deforming due to rapid drying. In some embodiments, the drying may be performed at a drying rate of about 40 to 60%/min.

The drying temperature may depend on various factors such as the solvent used and the atmosphere in which the drying is performed. The drying temperature may range from about 45° C. to about 110° C. In some embodiments, the drying may be performed at about 50° C. to about 90° C. In still other embodiments, the drying may be performed at about 60° C. to about 80° C. When the drying is performed in the above described range, the solvent may be dried without excessively contracting the porous substrate.

Hereinafter, a rechargeable lithium battery including the separator is described.

The rechargeable lithium battery may be classified as a lithium ion battery, a lithium ion polymer battery, or a lithium polymer battery according to the presence of a separator and the kind of electrolyte used therein. The rechargeable lithium battery may have a variety of shapes and sizes and, for example, may be a cylindrical, prismatic, coin, or pouch-type battery and may be a thin film type or a bulk type size. The structure and fabrication method for such lithium ion batteries are known to those of ordinary skill in the art.

The separator has a coating layer including a polymer binder and thus, has improved adhesion. Accordingly, the separator may be stably adhered to an electrode and thus, there is no gap due to detachment from the electrode, but instead, the separator and electrode may be firmly fixed together.

Figure 5:
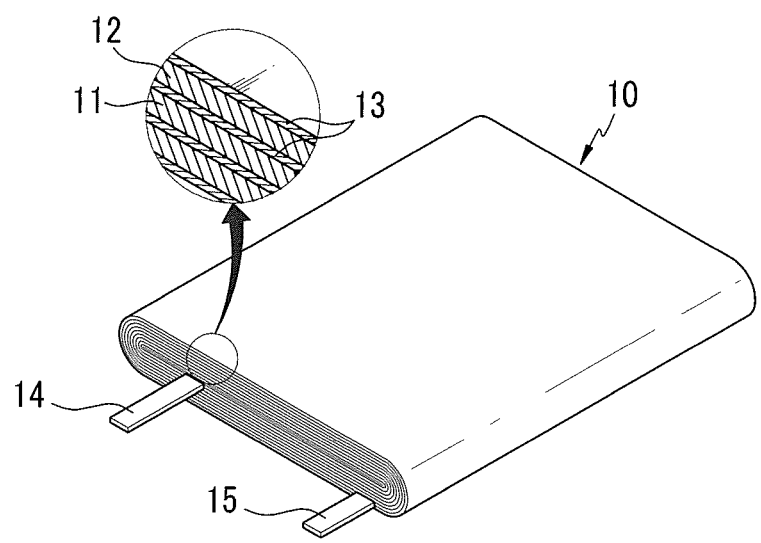
FIG. 5 is a perspective view of a rechargeable lithium battery according to one embodiment with a portion of the battery exploded out to show various components.

FIG. 5 is an exploded perspective view of a rechargeable lithium battery according to one embodiment.

Referring to FIG. 5, a rechargeable lithium battery includes a jelly roll-type electrode assembly 10 and a case (not shown).

The electrode assembly 10 may have a jelly roll shape formed by winding a negative electrode 11 and a positive electrode 12 with a separator 13 therebetween. The negative electrode 11, positive electrode 12, and separator 13 may be impregnated by an electrolyte (not shown).

The negative electrode 11 includes a current collector and a negative active material layer disposed on the current collector.

The current collector may be a copper foil, a nickel foil, a stainless steel foil, a titanium foil, a nickel foam, a copper foam, a polymer substrate coated with a conductive metal, or combinations thereof.

The negative active material layer includes a negative active material, a binder, and optionally a conductive material.

The negative active material may include one or more of a material that reversibly intercalates/deintercalates lithium ions, a lithium metal, a lithium metal alloy, a material capable of doping and dedoping lithium, or a transition metal oxide.

The material that reversibly intercalates/deintercalates lithium ions may include carbonaceous materials. Carbonaceous materials may be any carbon-based negative active material generally used in lithium ion rechargeable batteries.

Examples of the carbonaceous material include crystalline carbon, amorphous carbon, and combinations thereof. The crystalline carbon may be non-shaped, or sheet, flake, spherical, or fiber shaped natural graphite or artificial graphite. The amorphous carbon may be a soft carbon (carbon obtained by sintering at a low temperature), a hard carbon, a mesophase pitch carbonized product, fired coke, or the like.

The lithium metal alloy may include lithium and a metal selected from Na, K, Rb, Cs, Fr, Be, Mg, Ca, Sr, Si, Sb, Pb, In, Zn, Ba, Ra, Ge, Al, Sn, or combinations thereof.

The material capable of doping and dedoping lithium may include Si, $SiO_x$ (0<x<2), a Si—C composite, a Si-Q alloy (wherein Q is not Si and is an element selected from alkali metals, alkaline-earth metals, Group 13 to 16 elements, transition elements, rare earth elements, or combinations thereof), Sn, $SnO_2$, a Sn—C composite, Sn—R (wherein R is not Sn and is an element selected from alkali metals, alkaline-earth metals, Group 13 to 16 elements, transition elements, rare earth elements, or combinations thereof), and the like. Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

The transition metal oxide may be vanadium oxide, lithium vanadium oxide, or the like.

The binder improves the binding properties of the negative active material particles to one another and to the current collector. Examples of the binder include polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, styrene-butadiene rubbers, acrylated styrene-butadiene rubbers, epoxy resins, nylon, and the like, but the binder is not limited thereto.

The conductive material improves the electrical conductivity of the negative electrode. Any electrically conductive material may be used as a conductive agent, unless it causes a chemical change. Examples of the conductive material include carbon-based materials such as natural graphite, artificial graphite, carbon black, acetylene black, Ketjen black, carbon fibers, or the like; metal-based materials such as metal powders or metal fibers including copper, nickel, aluminum, silver, or the like; conductive polymers such as polyphenylene derivatives; and mixtures thereof.

The positive electrode 12 includes a current collector and a positive active material layer disposed on the current collector.

The current collector may be Al, but it is not limited thereto.

The positive active material layer may include a positive active material, a binder, and optionally a conductive material.

The positive active material may include one or more lithiated intercalation compounds that reversibly intercalate and deintercalate lithium ions. The positive active material may include a composite oxide including lithium and at least one of cobalt, manganese, or nickel. In particular, the following lithium-containing compounds may be used:

$Li_aA_{1-b}R_bD_2$ (wherein, in the above formula, 0.90≤a≤1.8 and 0≤b≤0.5); $Li_aE_{1-b}R_bO_{2-c}D_c$ (wherein, in the above formula, 0.90≤a≤1.8, 0≤b≤0.5, and 0≤c≤0.05); $LiE_{2-b}R_bO_{4-c}D_c$ (wherein, in the above formula, 0≤b≤0.5 and 0≤c≤0.05); $Li_aNi_{1-b-c}Co_bR_cD_\alpha$ (wherein, in the above formula, 0.90≤a≤1.8, 0≤b≤0.5, 0≤c≤0.05, and 0≤α≤2); $Li_aNi_{1-b-c}Co_bR_cO_{2-\alpha}Z_\alpha$ (wherein, in the above formula, 0.90≤a≤1.8, 0≤b≤0.5, 0≤c≤0.05, and 0≤α≤2); $Li_aNi_{1-b-c}Co_bR_cO_{2-\alpha}Z_2$ (wherein, in the above formula, 0.90≤a≤1.8, 0≤b≤0.5, 0≤c≤0.05, and 0≤α≤2); $Li_aNi_{1-b-c}Mn_bR_cD_\alpha$ (wherein, in the above formula, 0.90≤a≤1.8, 0≤b≤0.5, 0≤c≤0.05, and 0≤α≤2); $Li_aNi_{1-b-c}Mn_bR_cO_{2-\alpha}Z_\alpha$ (wherein, in the above formula, 0.90≤a≤1.8, 0≤b≤0.5, 0≤c≤0.05, and 0≤α≤2); $Li_aNi_{1-b-c}Mn_bR_cO_{2-\alpha}Z_2$ (wherein, in the above formula, 0.90≤a≤1.8, 0≤b≤0.5, 0≤c≤0.05, and 0≤α≤2); $Li_aNi_bE_cG_dO_2$ (wherein, in the above formula, 0.90≤a≤1.8, 0≤b≤0.9, 0≤c≤0.5, and 0.001≤d≤0.1); $Li_aNi_bCo_cMn_dG_eO_2$ (wherein, in the above formula, 0.90≤a≤1.8, 0≤b≤0.9, 0≤c≤0.5, 0≤d≤0.5, and 0.001≤e≤0.1); $Li_aNiG_bO_2$ (wherein, in the above formula, 0.90≤a≤1.8 and 0.001≤b≤0.1); $Li_aCoG_bO_2$ (wherein, in the above formula, 0.90≤a≤1.8 and 0.001≤b≤0.1); $Li_aMnG_bO_2$ (wherein, in the above formula, 0.90≤a≤1.8 and 0.001≤b≤0.1); $Li_aMn_2G_bO_4$ (wherein, in the above formula, 0.90≤a≤1.8 and 0.001≤b≤0.1); $QO_2$; $QS_2$; $LiQS_2$; $V_2O_5$; $LiV_2O_5$; $LiTO_2$; $LiNiVO_4$; $Li_{(3-f)}J_2(PO_4)_3$ (0≤f≤2); $Li_{(3-f)}Fe_2(PO_4)_3$ (0≤f≤2); and $LiFePO_4$.

In the above chemical formulae, A is Ni, Co, Mn, or a combination thereof; R is Al, Ni, Co, Mn, Cr, Fe, Mg, Sr, V, a rare earth element, or a combination thereof; D is O, F, S, P, or a combination thereof; E is Co, Mn, or a combination thereof; Z is F, S, P, or a combination thereof; G is Al, Cr, Mn, Fe, Mg, La, Ce, Sr, V, or a combination thereof; Q is Ti, Mo, Mn, or a combination thereof; T is Cr, V, Fe, Sc, Y, or a combination thereof; and J is V, Cr, Mn, Co, Ni, Cu, or a combination thereof.

The lithiated intercalation compounds may have a coating layer on the surface or may be mixed with a compound having a coating layer. The coating layer may include at least one coating element compound selected from oxides of a coating element, hydroxides of a coating element, oxyhydroxides of a coating element, oxycarbonates of a coating element, or hydroxyl carbonates of a coating element. The compounds for a coating layer can be amorphous or crystalline. The coating element for the coating layer may be Mg, Al, Co, K, Na, Ca, Si, Ti, V, Sn, Ge, Ga, B, As, Zr, or a mixture thereof. The coating layer can be formed in any method having no negative influence on the properties of the positive active material. For example, the coating method may include any suitable coating method such as spray coating, dipping, or the like.

The binder improves binding properties of the positive active material particles to one another and to the current collector. Examples of the binder include polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, styrene-butadiene rubbers, acrylated styrene-butadiene rubbers, epoxy resins, nylon, and the like, but the binder is not limited thereto.

The conductive material improves electrical conductivity of the positive electrode. Any electrically conductive material may be used as a conductive agent, unless it causes a chemical change. Examples of the conductive material include carbon-based materials such as natural graphite, artificial graphite, carbon black, acetylene black, Ketjen black, carbon fibers, or the like; metal-based materials such as metal powders or metal fibers including copper, nickel, aluminum, silver, or the like; conductive polymers such as polyphenylene derivatives; and mixtures thereof.

The negative electrode 11 and positive electrode 12 may each be fabricated by mixing the active material, a conductive material, and a binder to form an active material slurry, and coating the slurry on a current collector. The solvent may include N-methylpyrrolidone or the like, but it is not limited thereto. Electrode-manufacturing methods are known to those of ordinary skill in the art.

The negative electrode 11 and positive electrode 12 are connected with a negative lead tab 14 and a positive lead tab 15, respectively, and the negative lead tab 14 and positive lead tab 15 extend from the same side of the electrode assembly 10.

The electrolyte includes a non-aqueous organic solvent and a lithium salt.

The non-aqueous organic solvent serves as a medium for transmitting ions taking part in the electrochemical reactions of the battery.

The non-aqueous organic solvent may be selected from carbonate-based solvents, ester-based solvents, ether-based solvents, ketone-based solvents, alcohol-based solvents, aprotic solvents, or combinations thereof. Non-limiting examples of the carbonate-based solvent include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), combinations thereof, and the like. Non-limiting examples of the examples of the ester-based solvent include methyl acetate, ethyl acetate, n-propyl acetate, 1,1-dimethylethyl acetate, methylpropionate, ethylpropionate, ɣ-butyrolactone, decanolide, valerolactone, mevalonolactone, caprolactone, combinations thereof, and the like. Non-limiting examples of the ether-based solvent include dibutyl ether, tetraglyme, diglyme, dimethoxyethane, 2-methyltetrahydrofuran, tetrahydrofuran, combinations thereof, and the like. Non-limiting examples of the ketone-based solvent include cyclohexanone and the like. Non-limiting examples of the alcohol-based solvent include ethanol, isopropylalcohol, and the like. Non-limiting examples of the aprotic solvent include nitriles such as R—CN (wherein R is a C2 to C20 linear, branched, or cyclic hydrocarbon group, and may include a double bond, an aromatic ring, or an ether bond), amides such as dimethylformamide or dimethylacetamide, dioxolanes such as 1,3-dioxolane, sulfolanes, combinations thereof, and the like.

A single non-aqueous organic solvent may be used or a mixture of solvents may be used. When the organic solvent includes a mixture, the mixture ratio can be controlled in accordance with the desired battery performance.

The carbonate-based solvent may include a mixture of a cyclic carbonate and a linear carbonate. In some embodiments, the cyclic carbonate and the linear carbonate are mixed in a volume ratio of about 1:1 to about 1:9. An electrolyte containing such a mixture may have enhanced performance.

In addition, the electrolyte may further include an aromatic hydrocarbon-based solvent in addition to the carbonate-based solvent. In some embodiments, the carbonate-based solvent and the aromatic hydrocarbon-based solvent are mixed together in a volume ratio of about 1:1 to about 30:1.

The aromatic hydrocarbon-based organic solvent may be an aromatic hydrocarbon-based compound represented by the following Chemical Formula 1.

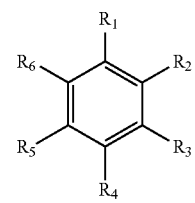

Chemical Formula 1

In Chemical Formula 1, $R_1$ to $R_6$ are each independently hydrogen, a halogen, a C1 to C10 alkyl group, a C1 to C10 haloalkyl group, or a combination thereof.

The aromatic hydrocarbon-based organic solvent may be, for example, benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or a combination thereof.

The non-aqueous electrolyte may further include vinylene carbonate or an ethylene carbonate-based compound represented by the following Chemical Formula 2 in order to improve the cycle-life of the battery.

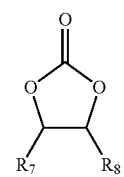

Chemical Formula 2

In Chemical Formula 2, $R_7$ and $R_8$ are each independently hydrogen, a halogen, a cyano group (CN), a nitro group ($NO_2$) or a C1 to C5 fluoroalkyl group, provided that at least one of $R_7$ and $R_8$ is a halogen, a cyano group (CN), a nitro group ($NO_2$), or a C1 to C5 fluoroalkyl group.

Examples of the ethylene carbonate-based compound include difluoro ethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The amount of the vinylene carbonate or the ethylene carbonate-based compound used may be adjusted within an appropriate range.

The lithium salt is dissolved in the non-aqueous solvent and supplies lithium ions in the rechargeable lithium battery, and improves lithium ion transfer between the positive and negative electrodes. Non-limiting examples of the lithium salt include supporting electrolytic salts, such as, $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein, x and y are natural numbers), LiCl, LiI, $LiB(C_2O_4)_2$ (lithium bis(oxalato)borate, LiBOB), or a combination thereof. The lithium salt may be used in a concentration of about 0.1 to about 2.0 M. When the lithium salt is included within the above concentration range, it may improve electrolyte performance and lithium ion mobility due to optimal electrolyte conductivity and viscosity.

The separator 113 separates the negative electrode 112 from the positive electrode 114 and provides a path for lithium ions. The separator 113 includes a porous substrate and a coating layer as described above. The separator is the same as described above.

The following examples illustrate the present invention in more detail. These examples, however, should not in any sense be interpreted as limiting the scope of the present invention.

Fabrication of Separator

EXAMPLE 1

3 parts by weight of a styrene-butadiene rubber (SBR) having an average particle diameter of about 80 nm, 100 parts by weight of alumina particulate, and 0.5 parts by weight of a urethane emulsion having an average particle diameter of about 30 nm were mixed to prepare a slurry. The slurry was coated to a 16 μm thickness on both sides of a polyethylene substrate and dried at a drying rate of 50%/min, thereby fabricating a separator having a coating layer with a thickness of about 3 μm.

EXAMPLE 2

10 parts by weight of polyvinylidene fluoride (PVdF) dissolved in N-methyl-2-pyrrolidone (NMP) were mixed with 100 parts by weight of alumina particulate and 0.5 parts by weight of a styrene-butadiene rubber (SBR) (an average particle diameter of about 80 nm). The mixture was agitated, thereby preparing a slurry. The slurry was coated to a 16 μm thickness on both sides of a polyethylene substrate and dried at a drying rate of 50%/min, thereby fabricating a separator having a coating layer with a thickness of about 3 μm.

COMPARATIVE EXAMPLE 1

A separator was fabricated according to the same method as Example 1 except that no urethane emulsion was used.

COMPARATIVE EXAMPLE 2

A separator was fabricated according to the same method as Example 1 except that no styrene-butadiene rubber (SBR) was added.

COMPARATIVE EXAMPLE 3

A separator was fabricated according to the same method as Example 2 except that the drying was performed at a drying rate of 20%/min.

Analysis 1: Examination of Cross-Section and Surface of Separator

Figure 6:
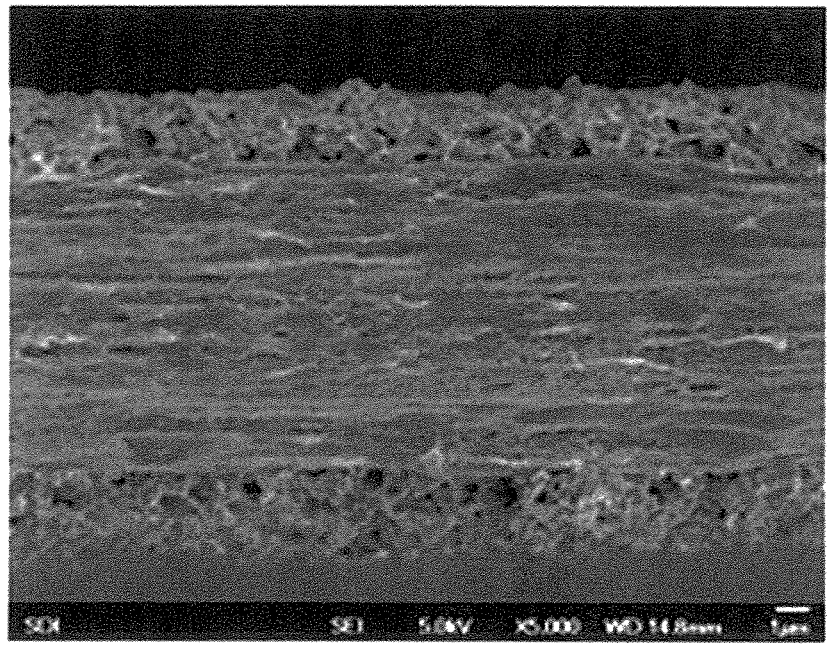
FIG. 6 is a scanning electron microscope (SEM) photograph of the separator of Example 2.

FIG. 6 is a scanning electron microscope (SEM) photograph of the separator according to Example 2.

Referring to FIG. 6, the separator according to Example 2 had a coating layer having a predetermined thickness on both sides of the separator.

Figure 7:
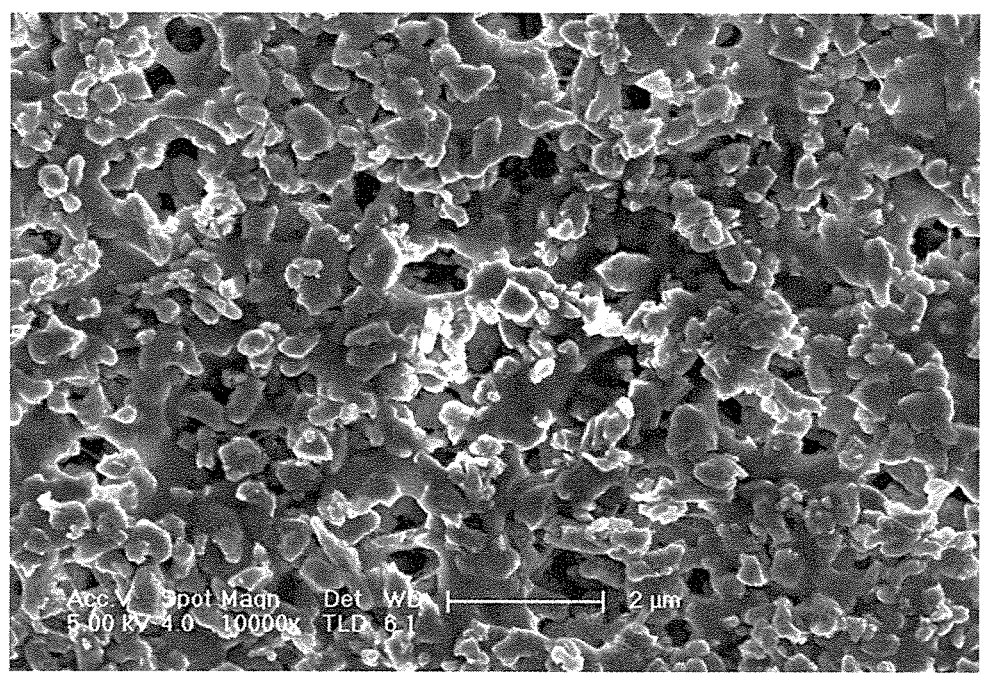
FIG. 7 is a SEM photograph of the surface of the coating layer on the separator of Example 2.
Figure 8:
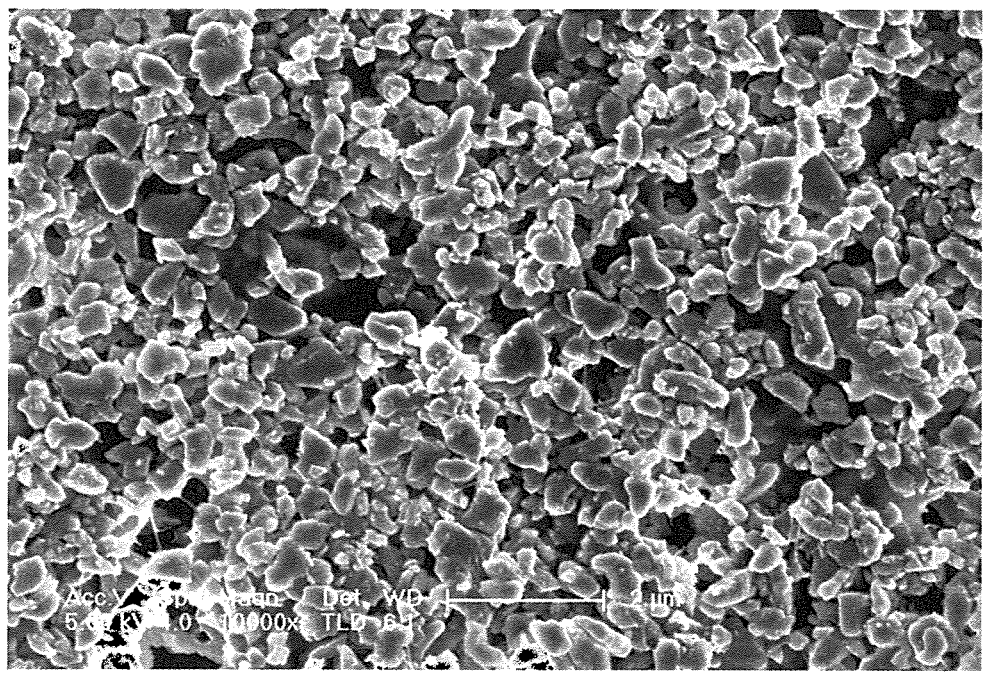
FIG. 8 is a SEM photograph of the surface of the coating layer on the separator of Comparative Example 3.

FIG. 7 is a SEM photograph showing the surface of the coating layer on the separator according to Example 2, while FIG. 8 is a SEM photograph showing the surface of the coating layer on the separator according to Comparative Example 3.

Referring to FIGS. 7 and 8, more polymer binder is included at the surface of the coating layer of the separator according to Example 2 than at the surface of the coating layer of the separator according to Comparative Example 3.

Analysis 2: Distribution of Polymer Binder

The separator according to Example 2 was mapping-analyzed to examine the distribution of styrene-butadiene rubber (SBR), a particulate polymer binder. The mapping analysis was performed using energy dispersive X-Ray spectroscopy (EDS).

In order to examine the distribution of styrene-butadiene rubber (SBR) in the coating layer, the separator was fabricated according to the same method as Example 2 except that alumina was not included.

Figure 9:
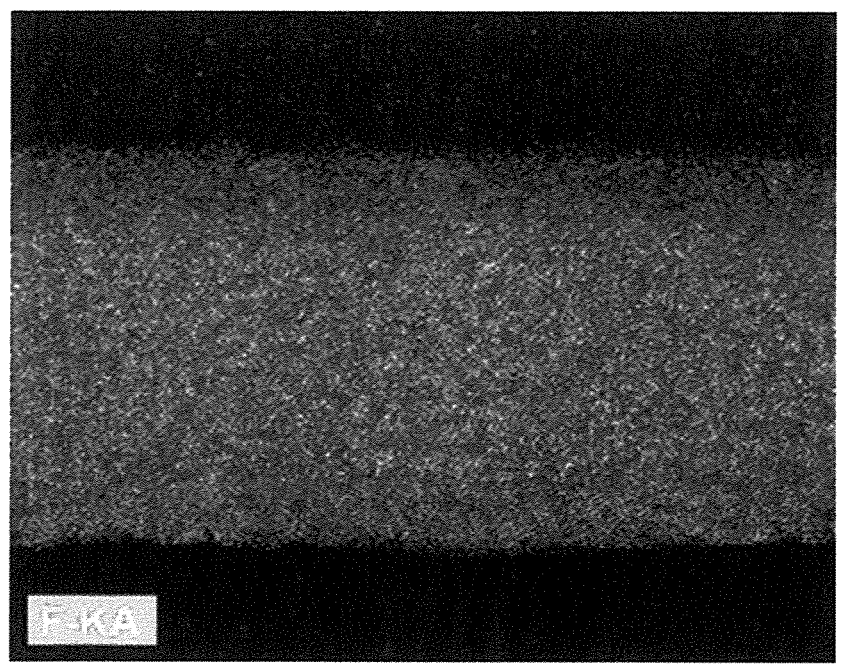
FIG. 9 is an energy dispersive X-ray spectroscopy mapping analysis of fluorine at a cross section of the coating layer of the separator according to Example 2.

FIG. 9 is an EDS mapping analysis of fluorine at a cross section of the coating layer of the separator.

Referring to FIG. 9, the top (surface) of the coating layer included fewer fluorine atoms than the bottom (near to a polyethylene substrate) of the coating layer. The analysis results show that styrene-butadiene rubbers (SBR) including no fluorine atoms are present in greater amounts at the surface of the coating layer because more styrene-butadiene rubber (SBR) particles move toward the surface during the drying of the coating layer.

Evaluation 1: Thermal Shrinkage Ratio

The separators according to Examples 1 and 2 and Comparative Examples 1 to 3 were heat-treated in a 130° C. convection oven for 10 minutes and then cooled down to room temperature. The separators were measured to determine their shrinkage ratio before and after the heat treatment.

The results are provided in Table 1.

TABLE 1

|  | Thermal shrinkage ratio |
| --- | --- |
| Example 1 | ◯ |
| Example 2 | ◉ |
| Comparative Example 1 | ◯ |

TABLE 1-continued

| | Thermal shrinkage ratio |
|---|---|
| Comparative Example 2 | ⊚ |
| Comparative Example 3 | ○ |

⊚: Thermal shrinkage ratio is less than or equal to 3%
○: Thermal shrinkage ratio is larger than 3% and less than or equal to 5%
Δ: Thermal shrinkage ratio is larger than 5% and less than or equal to 7%
X: Thermal shrinkage ratio is larger than 7%

Referring to Table 1, the separators according to Examples 1 and 2 had thermal shrinkage ratios similar to the separators according to Comparative Examples 1 to 3. Accordingly, polymer binders according to embodiments of the invention (i.e., a polymer binder including a urethane emulsion or styrene-butadiene rubber (SBR)) included in Examples 1 and 2 did not have a negative effect on heat resistance.

Fabrication of Rechargeable Lithium Battery Cell

EXAMPLE 3

A positive active material slurry was prepared by mixing $LiCoO_2$ as a positive active material, polyvinylidene fluoride (PVDF) as a binder, and carbon as a conductive agent in a weight ratio of 92:4:4 to form a mixture, and dispersing the mixture in N-methyl-2-pyrrolidone. The slurry was coated on a 20 μm thick aluminum foil, dried, and compressed, thereby fabricating a positive electrode.

A negative active material slurry was prepared by mixing artificial graphite as a negative active material, styrene-butadiene rubber as a binder, and carboxymethylcellulose as a thickener in a weight ratio of 96:2:2 to form a mixture, and dispersing the mixture in water. This slurry was coated on a 15 μm-thick copper foil, dried, and compressed, thereby fabricating a negative electrode.

The positive and negative electrodes and the separator according to Example 1 were used to fabricate a pouch-type rechargeable lithium battery cell. An electrolyte was prepared by mixing ethyl carbonate (EC)/ethylmethyl carbonate (EMC)/diethyl carbonate (DEC) (at volume ratio of 3/5/2) and including $LiPF_6$ at a concentration of 1.3 M.

EXAMPLE 4

A rechargeable lithium battery cell was fabricated according to the same method as Example 3 except that the separator according to Example 2 was used instead of the separator according to Example 1.

COMPARATIVE EXAMPLE 3

A rechargeable lithium battery cell was fabricated according to the same method as Example 3 except that the separator according to Comparative Example 1 was used instead of the separator according to Example 1.

COMPARATIVE EXAMPLE 4

A rechargeable lithium battery cell was fabricated according to the same method as Example 3 except that the separator according to Comparative Example 2 was used instead of the separator according to Example 1.

COMPARATIVE EXAMPLE 5

A rechargeable lithium battery cell was fabricated according to the same method as Example 3 except that the separator according to Comparative Example 3 was used instead of the separator according to Example 1.

Evaluation 2: Adhesive Property

The rechargeable lithium battery cells according to Examples 3 and 4 and Comparative Examples 3 to 5 were decomposed and the adhesion of the separators to the positive and negative electrodes was evaluated.

The adhesiveness evaluation was measured by determining peel strength using a universal test machine (UTM).

The results are provided in Table 2.

TABLE 2

| | Adhesion |
|---|---|
| Example 3 | ⊚ |
| Example 4 | ⊚ |
| Comparative Example 3 | X |
| Comparative Example 4 | Δ |
| Comparative Example 5 | Δ |

⊚: Adhesion is greater than or equal to 0.03 N/mm
○: Adhesion is 0.01 to 0.02 N/mm
Δ: Adhesion is 0.005 to 0.01 N/mm
X: Adhesion is less than or equal to 0.005 N/mm Referring to Table 2, the rechargeable lithium battery cells according to Examples 3 and 4 had improved adhesion of the separators to the electrodes compared with the cells according to Comparative Examples 3 to 5.

Evaluation 3: Charge and Discharge Characteristics

The rechargeable lithium battery cells according to Examples 3 and 4 and Comparative Examples 3 to 5 were constant-current-charged at a 0.2 C rate up to a voltage of 4.2 V at 25° C., and constant-voltage-charged at 0.01 C while maintaining a voltage of 4.2V. Next, the rechargeable lithium battery cells were discharged with a constant current of 0.2 C to a voltage of 3.05 V (formation step).

Then, the rechargeable lithium battery cells were constant-current-charged at a 0.5 C rate up to a voltage of 4.2 V at 25° C. and constant-voltage-charged at 0.01 C while maintaining a voltage of 4.2 V. Then, the rechargeable lithium battery cells were discharged at a constant current of 0.5 C to a voltage of 3.0 V. The charge and discharge cycle was repeated 30 times repeated.

The results are provided in Table 3.

TABLE 3

| | Charge and discharge efficiency | Capacity retention |
|---|---|---|
| Example 3 | ⊚ | ⊚ |
| Example 4 | ⊚ | ⊚ |
| Comparative Example 3 | Δ | X |
| Comparative Example 4 | Δ | X |
| Comparative Example 5 | Δ | Δ |

⊚: Charge and discharge efficiency is greater than or equal to 98%/capacity retention is greater than or equal to 90%
Δ: Charge and discharge efficiency is greater than or equal to 97% and less than 98%/capacity retention is greater than or equal to 80% and less than 90%
X: Charge and discharge efficiency is less than 97%/capacity retention is less than 80%

Referring to Table 3, the rechargeable lithium battery cells according to Examples 3 and 4 had higher charge and discharge efficiency and capacity retention than the cells according to Comparative Examples 3 to 5. While not being bound by this theory, it is believed that the rechargeable lithium battery cells according to Examples 3 and 4 had higher charge and discharge efficiency and capacity retention as a result of the improved adhesive properties of the separator to the electrodes.

Referring to Tables 1 to 3, separators of the rechargeable lithium battery cells according to Examples 3 and 4 had similar thermal shrinkage ratios to those of the rechargeable lithium battery cells according to Comparative Examples 3 to 5, but the separators of Examples 3 and 4 had better adhesion to the electrode, thereby improving charge and discharge efficiency and capacity retention of the rechargeable lithium battery cells.

While certain exemplary embodiments have been illustrated and described, the invention is not limited to the disclosed embodiments. On the contrary, those of ordinary skill in the art will recognize that certain modifications and changes can be made to the described embodiments without departing from the spirit and scope of the disclosure, as described in the appended claims.

What is claimed is:

1. A separator for a lithium battery comprising:
a porous substrate; and
a coating layer on at least one side of the porous substrate, the coating layer having a first side adjacent to the porous substrate, and a second side opposite the first side, the coating layer comprising:
an inorganic compound; and
a polymer binder comprising a first polymer binder and a second polymer binder, and
wherein each of the first and second polymer binders is an emulsion type polymer binder that exists as particulates in a solvent, wherein the emulsion type polymer binder is a urethane-based polymer, a styrene-butadiene rubber, an acrylated styrene-butadiene rubber, an acrylonitrile-butadiene rubber, an acrylonitrile-butadiene-styrene rubber, an acrylic rubber, a butyl rubber, a fluorine rubber, polyethylene, polypropylene, an ethylene propylene copolymer, an ethylene propylene diene copolymer, polystyrene, or a combination thereof,
wherein the first polymer binder has a first average particle diameter of about 50 nm to about 500 nm and the second polymer binder has a second average particle diameter of about 20 nm to about 400 nm, the second average particle diameter being less than or equal to 80% of the first average particle diameter,
the polymer binder comprises a greater amount of the first polymer binder than the second polymer binder, and
wherein an amount of the second polymer binder at the second side is greater than an amount of the second polymer binder at the first side.

2. The separator of claim 1, wherein the first polymer binder is present in the polymer binder in an amount of about 70 to 99 parts by weight based on the total weight of the polymer binder, and the second polymer binder is present in the polymer binder in an amount of about 1 to 30 parts by weight based on the total weight of the polymer binder.

3. The separator of claim 1, wherein the polymer binder is present in the coating layer in an amount of about 1 to 30 parts by weight based on 100 parts by weight of the inorganic compound.

4. The separator of claim 1, wherein the inorganic compound comprises a material selected from the group consisting of metal oxides, semi-metal oxides, metal fluorides, metal hydroxides, and combinations thereof.

5. The separator of claim 4, wherein the inorganic compound is selected from the group consisting of $Al_2O_3$, $SiO_2$, $TiO_2$, $SnO_2$, $CeO_2$, MgO, NiO, CaO, ZnO, $ZrO_2$, $Y_2O_3$, $SrTiO_3$, $BaTiO_3$, $Mg(OH)_2$, MgF, and combinations thereof.

6. The separator of claim 1, wherein the inorganic compound has a particle diameter of about 1 nm to 800 nm.

7. The separator of claim 1, wherein the emulsion type polymer binder is an acrylated styrene-butadiene rubber, an acrylonitrile-butadiene rubber, an acrylonitrile-butadiene-styrene rubber, an acrylic rubber, a butyl rubber, polyethylene, polypropylene, an ethylene propylene copolymer, an ethylene propylene diene copolymer, polystyrene, or a combination thereof.

8. A rechargeable lithium battery comprising:
a positive electrode comprising a positive active material;
a negative electrode comprising a negative active material; and
the separator of claim 1 between the positive electrode and the negative electrode.

9. A method of forming the separator for a lithium battery according to claim 1, the method comprising:
mixing the inorganic compound and the polymer binder to form a slurry;
applying the slurry to at least one side of the porous substrate; and
drying the slurry at a rate of about 30 to 70%/min to form the coating layer.

10. The method of claim 9, wherein the drying the slurry comprises drying the slurry at a rate of about 40 to 60%/min.

* * * * *